(12) United States Patent
Kamath et al.

(10) Patent No.: US 8,630,009 B2
(45) Date of Patent: Jan. 14, 2014

(54) SYSTEMS AND METHODS FOR PROVIDING CONTENT TO A PERIPHERAL DEVICE

(75) Inventors: Harish B Kamath, Bengalooru (IN); Sudhakaran Karunakaran, Bangalore (IN); Venugopal Kumarahalli Srinivasmurthy, Bangalore (IN); Hitesh Amrutlal Bosamiya, Bangalore (IN); Palanikumar Thangapandian, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/197,394

(22) Filed: Aug. 3, 2011

(65) Prior Publication Data

US 2013/0033722 A1 Feb. 7, 2013

(51) Int. Cl.
*G06F 3/12* (2006.01)

(52) U.S. Cl.
USPC .......... 358/1.15; 358/1.9; 358/3.23; 358/1.16

(58) Field of Classification Search
USPC .................................. 715/733–752
See application file for complete search history.

(56) References Cited

U.S. PATENT DOCUMENTS

| | | |
|---|---|---|
| 2003/0030664 A1 | 2/2003 | Parry |
| 2009/0083625 A1 | 3/2009 | Liu |
| 2009/0219563 A1 | 9/2009 | Morales |
| 2010/0171976 A1 | 7/2010 | Greene et al. |
| 2011/0072035 A1* | 3/2011 | Gaucas et al. ................ 707/769 |
| 2011/0258549 A1* | 10/2011 | Chapple et al. ............... 715/733 |

* cited by examiner

*Primary Examiner* — Benny Q Tieu
*Assistant Examiner* — Marcellus Augustin (57) ABSTRACT

One example discloses a system for providing content to a peripheral device including a memory for storing computer executable instructions and a processing unit for accessing the memory and executing the computer executable instructions. The computer executable instructions include a composite application to invoke, in response to a user-input at a peripheral device, a predetermined set of print applications from a plurality of print applications stored in a cloud server, the composite application to provide content from the plurality of print applications to the peripheral device.

12 Claims, 5 Drawing Sheets

SYSTEMS AND METHODS FOR PROVIDING CONTENT TO A PERIPHERAL DEVICE

BACKGROUND

Individuals are increasingly turning to Internet resources for news and entertainment content. Since access to the Internet is not always available, some users print their favorite content to read or share with others. To do so, many users generally either print the entire website or manually preview and select areas on the website that they wish to print.

DETAILED DESCRIPTION

Figure 1:
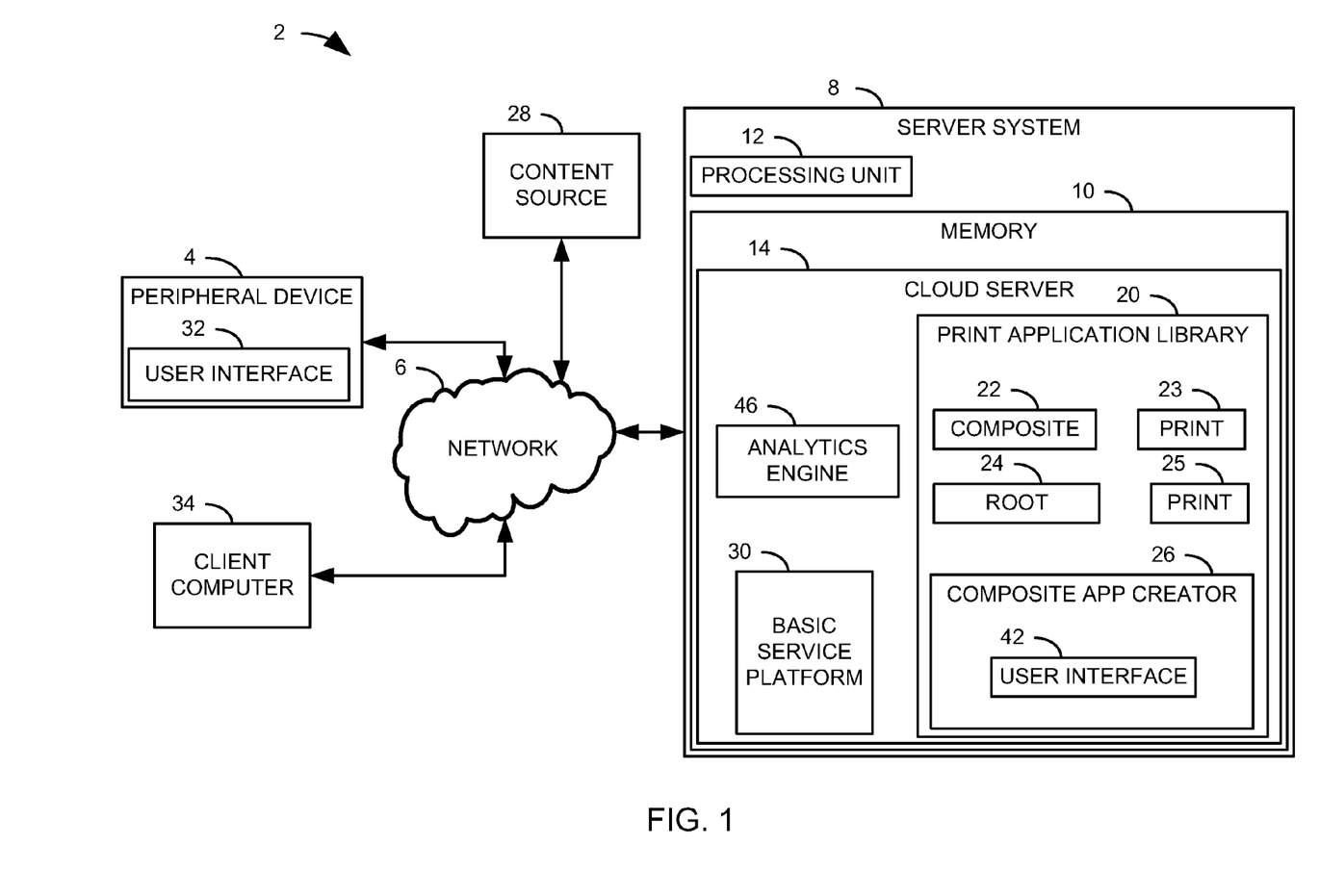
FIG. 1 illustrates an example of a system for controlling the service of content to a peripheral device.

FIG. 1 illustrates an example of a network system 2 for controlling the service of content to a peripheral device 4, such as a printer, scanner, or similar device. The network system 2 could be implemented, for example, as including a computing cloud. The peripheral device 4 can be connected to a network 6, such as the Internet or a wide area network associated with the peripheral device. Nodes on the network 6 can communicate via a communications protocol, such as Transmission Control Protocol/Internet Protocol (TCP/IP), Internet Protocol version 6 (IPv6), etc. The peripheral device 4 can be implemented as a cloud peripheral, wherein the peripheral device 4 can be assigned a node address (e.g., an IP address) on the network 6. There can be any number of peripheral devices in the network system 2.

The peripheral device 4 can be registered with a server system 8, such that the server system can provide instructions to the peripheral device in a format acceptable to the device. Moreover, in some examples, the peripheral device 4 can be designed to provide a plurality of different selectable features, such as, but not limited to features dealing with the appearance and format of content, such as can be sent to, printed or stored at the device, and the registration of the peripheral device 4 with the server system 8 can include data representing these features.

For purposes of simplification of explanation, in the present example, different components of the network system 2 are illustrated and described as performing different functions. However, one of ordinary skill in the art will understand and appreciate that the functions of the described components can be performed by different components, and the functionality of several components can be combined and executed on a single component. The components can be implemented, for example, as machine readable instructions (e.g., software or firmware), hardware (e.g., a computer, an application specific integrated circuit), or as a combination of both. In other examples, the components could be distributed among remote devices across the network 6 (e.g., computer readable instructions implemented as external web services).

The server system 8 can include, for example, memory 10 for storing computer executable instructions and a processing unit 12 (e.g., a processor core) for accessing the memory 10 and executing computer executable instructions. The memory 10 can include a cloud server 14. In one example, the cloud server 14 can include a library of print applications 20 storing a plurality of print applications 22-26 that can be accessed by a user to provide remote content, for example, from an associated content source 28, to the peripheral device 4 or transfer content from the peripheral device to another device on the network 6. In one example, the print applications can be Simple Internet Printing ("SIP") applications. For example, the content can be stored external to a local network associated with the peripheral device 4. For example, print applications can include applications for retrieving content and formatting it as a print job, sending messages between peripheral devices, and serving advertisements or status updates to the peripheral device, as disclosed herein. The cloud server 14 further includes a print basic service platform 30 comprising software for supporting the execution of the print applications.

The cloud server 14 can be configured to provide a payload comprising commands to the peripheral device 4 in a protocol native to the peripheral device, which can be referred to as a print document. For instance, the print document can include printer command language (PCL) commands, portable document format (PDF) commands, HEWLETT PACKARD® Graphics Language (HPGL), commands, etc. To provide the instruction message, the cloud server 14 can include a driver for the peripheral device 4. In some examples, the driver for the peripheral device 4 could be provided to cloud server 14 from an external system (e.g., a web service).

The plurality of print applications 22-26 stored at the cloud server 14 can include a print application 22, referred to as a "composite applications" configured to call and execute a plurality of other print applications. In one example, the composite application 22 can be invoked by a user using a user interface 32, such as a touch screen display, at the peripheral device 4 as to perform the functions of the print applications called by the composite application and combine the resulting content into a single composite document. It will be appreciated that any parameters provided, whether implicitly by the peripheral device or explicitly by the user, can be passed to the print applications called by the composite application. The composite application 22 can include a print template to guide generation of a continuous document representing plural units of content as a single document to the peripheral device 4. In one example, the print template can include boundary print marks that can be inserted between blocks of content (e.g., different documents or other forms of content) provided from different print applications called by the composite application. Accordingly, a user can retrieve the content provided by multiple print applications, with appropriate options selected, by invoking a single print function from the peripheral device.

The plurality of print applications 22-26 can also include a root application 24. The root application 24 can be invoked by the peripheral device 4 (e.g., via user input) whenever the device enters an Internet printing mode in which print applications can be invoked. The root application 24 provides a list of available print applications to the peripheral device 4 as to allow the user to select and invoke a print application at the user interface 32. In one example, the root application 24 can filter print applications according to properties of the peripheral device, such as can include any or all of the capabilities of the peripheral device 4, a location of the peripheral device, a primary language associated with the peripheral device, stored user preferences, and attributes of the print applications. It will be appreciated that this filtering can include multiple individual filters, including an automatically generated first filter responsive to the location and capabilities of the device and a second filter configured by the user to reflect user preferences. The filtering results in a proper subset (e.g., less than all) of the plurality of print applications 22-26 being displayed to the user. To avoid confusion for the user, any composite applications displayed to the user at the user interface 32 can have distinct icons (e.g., with a small yellow triangle in one corner or other indicia) to distinguish them from other (non-meta) print applications.

The plurality of print applications 22-26 can further include a composite application creator 26 to create additional composite applications from print applications stored in the print library 20. In one example, the composite application creator 26 can be made accessible from the peripheral device 4 via the user interface 32. In another example, a user can access the composite application creator 26 via a web browser on a client computer 34. The composite application creator 26 includes a user interface 42 to allow a user to select print applications from the print library 20 for incorporation into a composite application and to set parameters of the composite application. These parameters can include attributes, such as precedence values for the print applications, formatting parameters for the composite application as a whole or for the various applications or other attributes disclosed herein. During this process, a collation template for the various print applications can be selected, either by the user or the composite application creator and an associated order of execution of the print applications can be determined (e.g., based on attributes, such as including precedence values, of the constituent print applications). Additionally or alternatively, a print application can have a "hidden" attribute that prevents it from being displayed to a user during its execution. The composite application can then be published to the root application 24 as to make the composite application available at the peripheral device 4.

The cloud server 14 can further include an analytics engine 46 that monitors a frequency with which print applications within the print library 20 are invoked by the peripheral device 4. It will be appreciated that the analytics engine can also monitor used from multiple peripheral device and users and leverages that info to target benefits (e.g., optimal execution order) to particular users. It can also, for example generate app recommendations based on users that use similar SIP apps or have similar usage patterns. From this data, priority values, determining the order in which the print applications are displayed at the peripheral device 4 or executed in a composite can be calculated. Accordingly, content accessed most frequently by a user can be given priority, increasing the efficiency of accessing print applications at the user interface 32.

Figure 2:
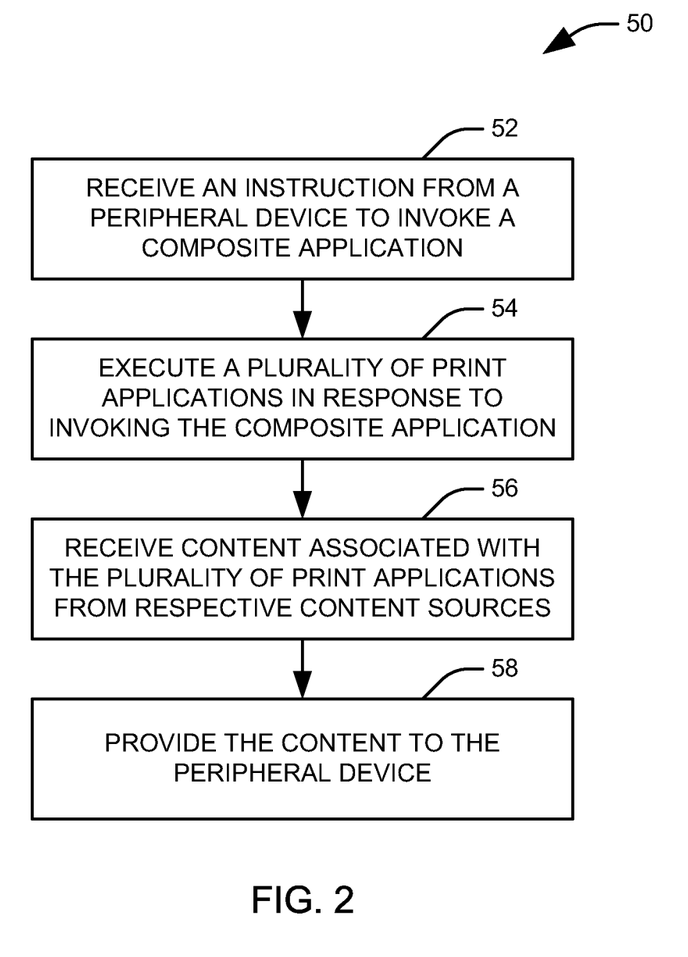
FIG. 2 illustrates a method for providing content to a peripheral device.

FIG. 2 illustrates a method 50 for providing content to a peripheral device from a server. At 52, an instruction is received from a peripheral device to invoke a composite application. For example, the instruction can include an indication that the peripheral device has entered an Internet printing mode or a command to execute a specific composite application associated with the server. At 54, a plurality of print applications are executed in response to invoking the composite application. Where the composite application is the root application, the plurality of print applications can include a set of applications at the server having an auto-execute attribute. It will be appreciated that the auto-execute attribute can be assigned to a print application by a user at the peripheral device or by an administrator at the server. In one example, an associated priority of each of the plurality of print applications can be determined based on associated attributes, and the plurality of print applications are executed in an order determined by their relative priorities.

At 56, content associated with each of the plurality of print applications is received from their associated content sources. For example, the content sources can include the server itself, other peripherals in the system, or third-party content providers. At 58, the received content is provided to the peripheral device. In one example, in which a specific composite application is invoked, the content returned from the plurality of print applications can be combined into a continuous document, and the continuous document can be provided to the peripheral device.

Figure 3:
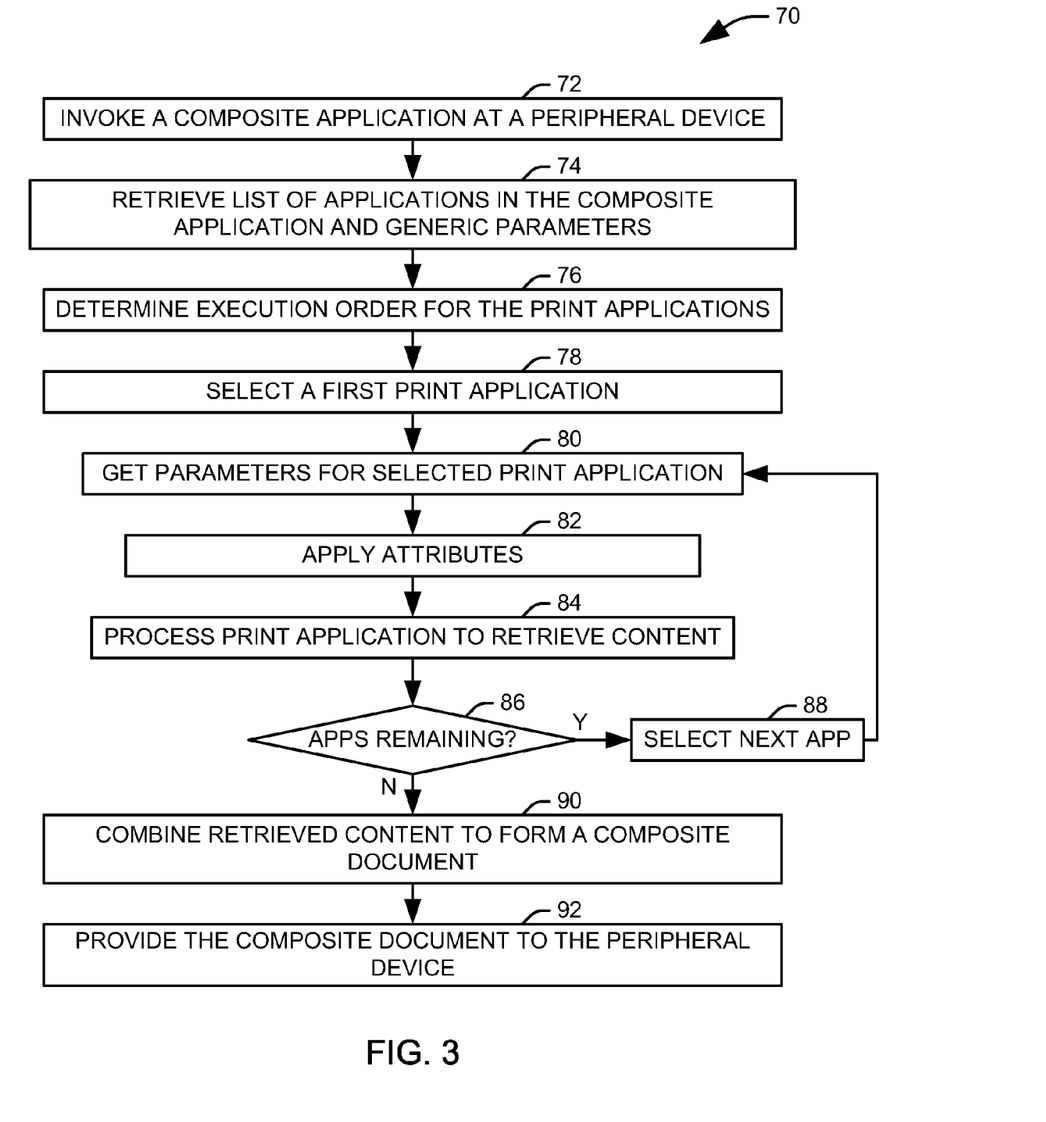
FIG. 3 illustrates an example of a method for executing a composite application stored on a remote server.

FIG. 3 illustrates an example of a method 70 for executing a composite application stored on a remote server. At 72, the composite is invoked at a peripheral device (e.g., the peripheral device 4 of FIG. 1). For example, the peripheral device can include a printer, scanner, or similar device having a built-in display. A user can select an icon on the display of the peripheral device representing the composite application, and a message can be provided to the remove server to execute the composite application.

At 74, a list of print applications associated with the composite application is retrieved, along with generic parameters governing the execution of its constituent print applications and a desired format of the output resulting from the composite. It will be appreciated that the generic parameters can include parameters drawn from the peripheral device itself or be programmed as attributes for the composite. For example, the parameters can define the capabilities of the device and its current settings, user preferences recorded in the composite, and other contextual information, such as a location and a primary language associated with the user.

At 76, a precedence value is retrieved for each print application, representing an associated priority of the print application during the processing. Accordingly, the print applications can be ranked according to their precedence values and ordered accordingly during execution of the composite application. The precedence values can be assigned to the print applications by a user during creation of the composite application, assigned to the print applications when they are created, or determined dynamically according to analytics based on print application usage. At 78, a first print application is selected from the ranked print applications.

At 80, parameters are retrieved for the print application. For example, the retrieved parameters can represent parameters specific to the application used for retrieving the content represented by the print application. In one example, such as a print for retrieving information from a news source, the parameters can include categorical parameters (e.g., politics, business, sports, etc.) defining content to be retrieved from the news source. In an application for printing data from a calendar, a parameter can govern the format in which the calendar is provided (e.g., by day, by week, a specific agenda etc.). At 82, attributes of the print application are applied. For example, if the print application has a "hidden" attribute, the application can run invisible to a user (e.g., a background process that is not selectable from the root application), and operations within the print application can be restricted. Additionally, a print application can have a "messaging" attribute, where it is displayed at an associated display of the peripheral device instead of being stored or printed. A print application used to provide an advertisement might have both of the attributes, with the advertisement displayed to the user at the device for a predetermined time period regardless of user input.

At 84, the print application is processed to retrieve associated content from a content source. It will be appreciated that the content source can be unaffiliated with the peripheral or the remote server, and can be provided by a third-party content provider. For example, the associated content can comprise an image (e.g., a .pdf file or other image format) or set of printing instructions formatted for the peripheral device. At 86, it is determined if any print applications associated with the composite application remains to be processed. If so (Y), a next print application on the ranked list of print applications is selected at 88, and the method 70 returns to 80 to process the selected print application.

If all of the print applications have been processed (N), the method 70 advances to 90, where the retrieved content from the plurality of print applications is combined to form a composite document. In combining the content from the various print applications, the composite application can use print templates, place boundary marks between the combined content, and provide a continuous flow of content across a print or scan region. Accordingly, the composite document can be configured to conserve bandwidth in transmission to the peripheral device as well as local resources (e.g., paper and toner) without compromising print quality. At 92, the composite document is provided to the peripheral device where it can be printed.

Figure 4:
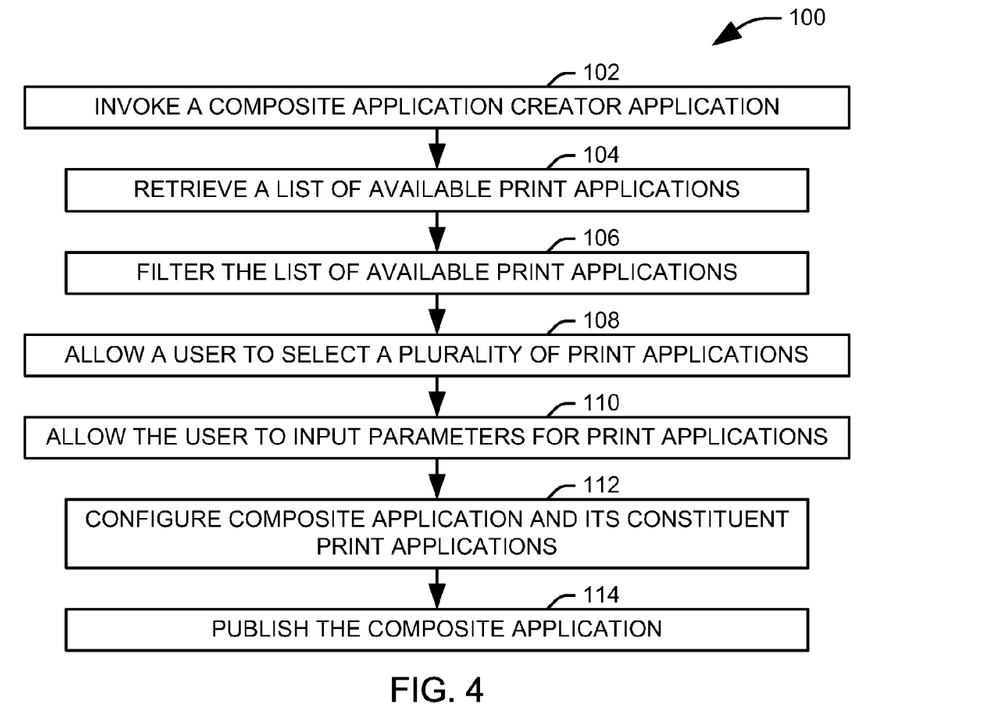
FIG. 4 illustrates an example method for creating a composite application.

FIG. 4 illustrates an example method 100 for creating a composite application. At 102, a composite creator (e.g., the composite creator 26 of FIG. 1) application is invoked. For example, the composite creator application can be accessed by the user at the peripheral device or at an associated computer via a web-based instantiation of the composite creator application. In the example method 100, the composite creator application can itself be a composite application and invoking the composite creator application can comprise selecting (e.g., at a peripheral device or client computer) an HTML link to execute the composite creator application on an associated cloud server.

At 104, the composite creator can retrieve a list of print applications available for incorporation into a composite application. For example, this can include all applications that would ordinarily be called by the Root-SIP, or a subset of the applications approved for use in the print-creator application. At 106, the list of available print applications can be filtered according to characteristics of the peripheral device. For example, applications can be filtered to provide a subset of print applications according to the capabilities of the peripheral device, the country and region in which the device is located, an associated primary language associated with the peripheral device, and any other appropriate characteristics of the peripheral device and the user.

At 108, the filtered applications are displayed to the user, and the user is allowed to select a plurality of print applications to package as the composite application. This can be accomplished via an appropriate user interface at a display panel on the peripheral device or a web-based interface. At 110, the user is allowed to select one or more parameters for the print applications and the composite. These parameters can include attributes, such as precedence values for the print applications or an auto-execute attribute for the composite, as well as formatting parameters for the various applications, including a document size and resolution, various printing options (e.g., duplex or non-duplex), and any other appropriate parameters for specifying a desired appearance of the content retrieved by the composite application. The user supplied parameters can also include selection of a name and associated display icon for the composite application. At 112, the composite application and its constituent print applications are configured. For example, a collation template for the various print applications can be selected, and an associated order of execution of the print applications can be determined. The composite application is then published at 114 to make the composite application available to the user. For example, the composite application can be published to a root application, such as if being created by the user. Alternatively or additionally, the composite application can be published in a public library such as can be accessible for use by any number of peripheral devices.

Figure 5:
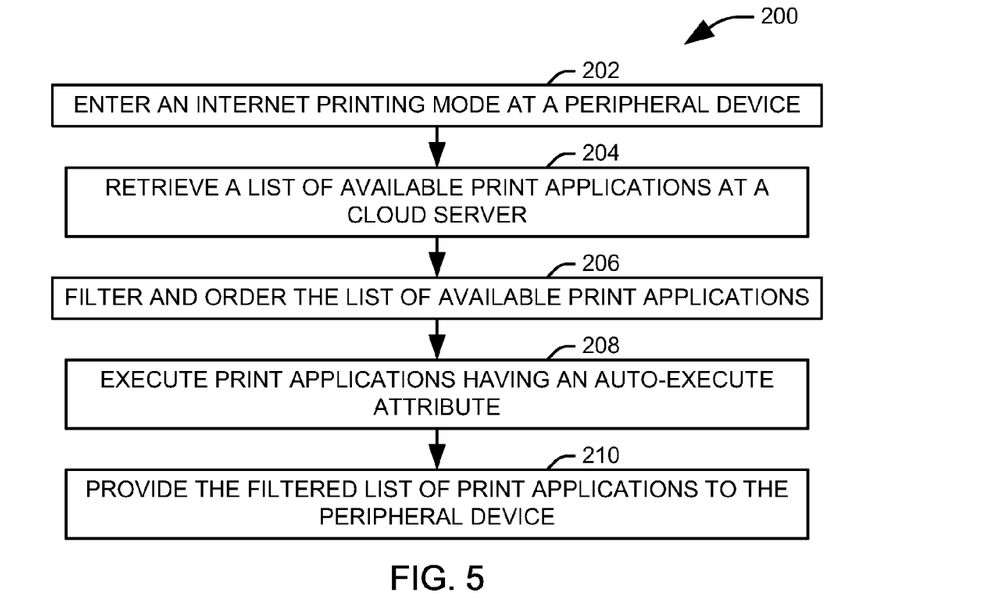
FIG. 5 illustrates a method for initializing an Internet printing mode at a peripheral device.

FIG. 5 illustrates a method 200 for initializing an Internet printing mode at a peripheral device. At 202, an Internet printing mode of the peripheral device is entered. For example, a user can select an appropriate icon on a display at the device to send a message to a cloud server associated with the device to invoke a root application. At 204, a list of available print applications is retrieved at the cloud server. For example, the list of available print applications (e.g., corresponding to a root application) can include any applications suitable for providing content or services to the peripheral device, given its capabilities, location, and primary language. It will be appreciated that the list of available print applications can include print applications with the hidden attribute and the auto-execute attribute.

At 206, the list of available print applications is filtered and ordered according to user preferences and associated attributes. For example, any print applications having the hidden attribute can be removed from the list, along with any print applications indicated by the user. The ordering of the print applications can be performed according to user provided precedence values or analytics stored at the cloud server. At 208, print applications having an auto-execute attribute are executed at the cloud server. It will be appreciated that some categories of print applications, such as those serving advertisements to the peripheral device, can be limited such that no more than a threshold number of print applications of the category are executed, with the selected print applications selected, for example, via analytics (e.g., the analytics engine 46 of FIG. 1) stored at the cloud server. It will be appreciated that the delivered content can include advertisements, status messages, or messages between users to be provided to a display associated with the peripheral device, as well as print jobs and images for processing at the peripheral device. At 210, the filtered list of print applications is provided to the peripheral device and displayed to the user.

Figure 6:
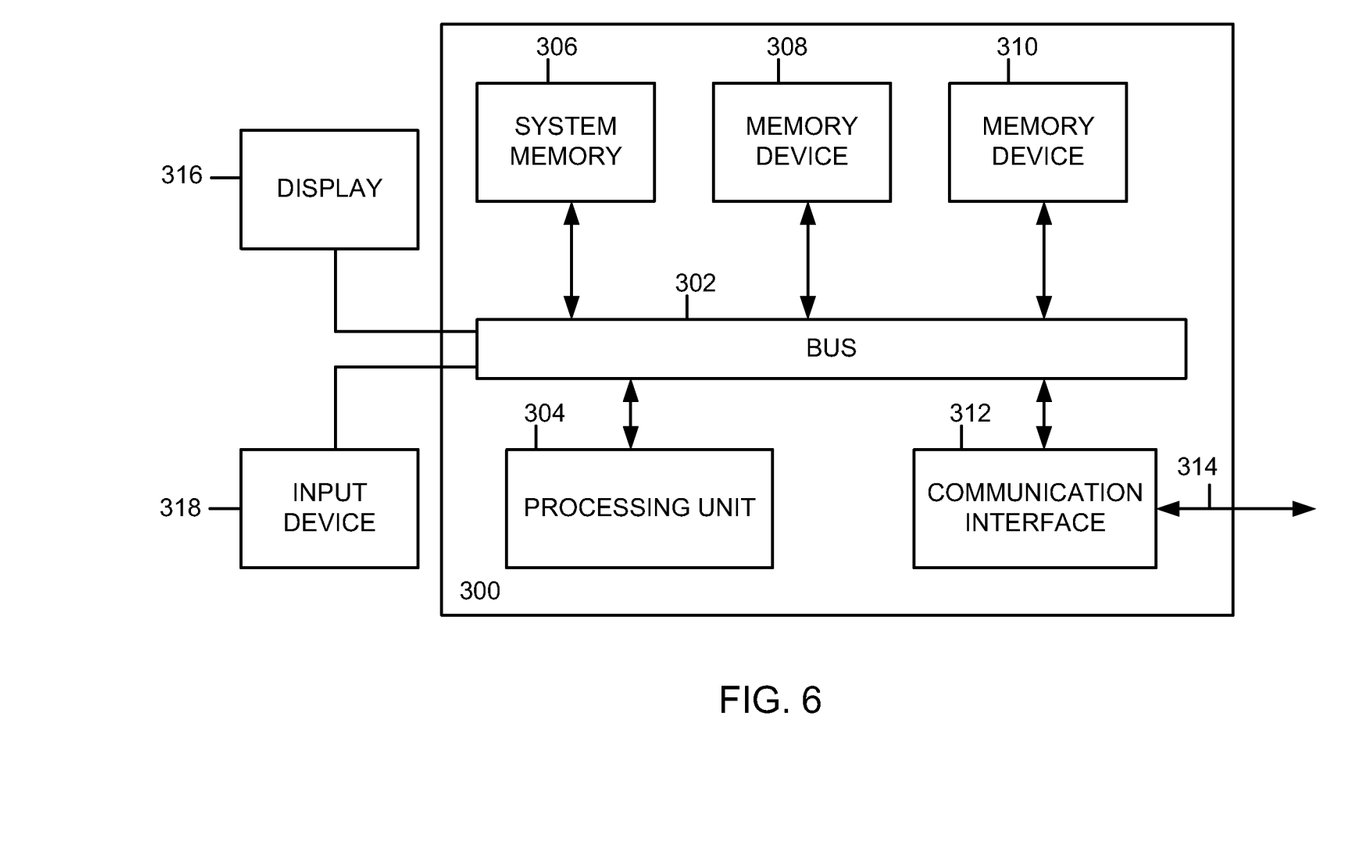
FIG. 6 illustrates an example of a computer system that can be employed to implement the systems and methods illustrated in FIGS. 1-4.

FIG. 6 is a schematic block diagram illustrating an example system 300 of hardware components capable of implementing examples disclosed in FIGS. 1-4, such as the server system 8, the client computer 16, and portions of the of peripheral device 4 illustrated in FIG. 1. The system 300 can include various systems and subsystems. The system 300 can be implemented, a personal computer, a laptop computer, a workstation, a computer system, an appliance, an application-specific integrated circuit (ASIC), a server, a server blade center, a server farm, a mobile device, such as a smart phone, a personal digital assistant, etc.

The system 300 can include a system bus 302, a processing unit 304, a system memory 306, memory devices 308 and 310, a communication interface 312 (e.g., a network interface), a communication link 314, a display 316 (e.g., a video screen), and an input device 318 (e.g., a keyboard and/or a mouse). The system bus 302 can be in communication with the processing unit 304 and the system memory 306. The additional memory devices 308 and 310, such as a hard disk drive, server, stand alone database, or other non-volatile memory, can also be in communication with the system bus 302. The system bus 302 operably interconnects the processing unit 304, the memory devices 306-310, the communication interface 312, the display 316, and the input device 318. In some examples, the system bus 302 also operably interconnects an additional port (not shown), such as a universal serial bus (USB) port.

The processing unit 304 can be a computing device and can include an application-specific integrated circuit (ASIC). The processing unit 304 executes a set of instructions to implement the operations of examples disclosed herein. The processing unit can include a processor core.

The additional memory devices 306, 308 and 310 can store data, programs, instructions, database queries in text or compiled form, and any other information that can be needed to operate a computer. The memories 306, 308 and 310 can be implemented as computer-readable media (integrated or removable) such as a memory card, disk drive, compact disk (CD), or server accessible over a network. In certain examples, the memories 306, 308 and 310 can comprise text, images, video, and/or audio.

Additionally, the memory devices 308 and 310 can serve as databases or data storage such as the print library 20 illustrated in FIG. 1. Additionally or alternatively, the system 300 can access an external system (e.g., a web service) through the communication interface 312, which can communicate with the system bus 302 and the communication link 314.

In operation, the system 300 can be used to implement, for example, a client computer, a cloud server, and at least some components of printers and other peripheral devices that can be employed to create and invoke print applications, such as disclosed with respect to the system of FIG. 1 and the methods of FIGS. 2-4. Computer executable instructions for implementing the system, such as the memory 10 of the server system 8 illustrated in FIG. 1, can reside in the system memory 306, and/or in the memory devices 308 and/or 310 in accordance with certain examples. The processing unit 304 thus accesses such memory 306, 308 and 310 and executes one or more computer executable instructions. In such an example, the system memory 306 and/or the memory devices 308 and/or 310 could be employed, for example, to implement the memory 10 illustrated in FIG. 1. The term "computer readable medium" as used herein refers to a non-transitory medium that participates in providing instructions to a processing unit for execution.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. Additionally, the term "based on" means based at least in part on. Furthermore, it will be understood that successively described examples are not mutually exclusive unless specific stated to be mutual exclusive options. It will also be appreciated that when a functional component is described as stored on a computer readable medium, it can be stored on a single medium or a set of media, each operably connected to another medium in the set or an associated processing unit.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A system comprising:
   memory for storing computer executable instructions; and
   a processing unit for accessing the memory and executing the computer executable instructions, the computer executable instructions comprising:
   a composite application to determine an associated priority of each of a predetermined set of print applications based on attributes thereof and invoke, in response to a user-input at a peripheral device, the predetermined set of print applications from a plurality of print applications stored in a cloud server in an order determined by their relative priorities, and to provide respective outputs returned from the predetermined set of print applications to the peripheral device, the composite application combining the respective outputs returned from each of the predetermined set of print applications into a single set of commands and content and providing the single set of commands and content to the peripheral device and organizing the outputs of the predetermined set of print applications into a continuous document based on the corresponding commands and content provided to the peripheral device using an associated template.

2. The system of claim 1, the composite application comprising a first composite application and the predetermined set of print applications comprising a first set of print applications, and the cloud server further comprising a print application creator to create, in response to user input, a second composite application to invoke a second set of print applications and combine content output by the second set of print applications as a set of corresponding commands and content provided to the peripheral device.

3. The system of claim 2, the print application creator comprising a third composite application in the cloud server, the print application creator being accessible to the user via a user interface of the peripheral device.

4. The system of claim 2, the print application creator comprising a third composite application in the cloud server, the print application creator being accessible via a web browser interface.

5. The system of claim 1, the composite application comprising a root application to provide a list of available print applications of the plurality of print applications to the peripheral device, verify an associated attribute of a print application of the plurality of print applications, and auto-execute the print application in response to the root application being invoked at the peripheral device.

6. The system of claim 1, the cloud server further comprising an analytics engine to record a frequency with which a print application from the plurality of print applications is accessed, an associated priority value of the print application being determined from the recorded frequency.

7. The system of claim 1, wherein the peripheral device comprises a printer.

8. A method comprising:
   receiving, by a processing unit, an instruction from a peripheral device, the instruction comprising an indication that the peripheral device has entered an Internet printing mode;
   determining a relative priority of each of a plurality of print applications associated with the instruction based on attributes thereof;
   executing the plurality of print applications in response to the instruction in an order determined by their relative priorities, the plurality of print applications comprising a root application and an other print application that are invoked in response to the instruction;

receiving respective outputs associated with the plurality of print applications from respective associated content sources;

combining the respective outputs returned from each of the plurality of print applications into a continuous document; and providing the continuous document to the peripheral device.

9. The method of claim 8, further comprising verifying that the other print application has an auto-execute attribute that indicates that it should be executed when the peripheral device enters Internet printing mode.

10. The method of claim 8, wherein the peripheral device comprises a printer.

11. A method comprising:

receiving, by a processing unit, a first instruction from a peripheral device at a processing component indicating that the peripheral device has entered an Internet printing mode;

invoking a root application in response to the first instruction, the root application selecting a first plurality of print applications according to an associated attribute;

determining a relative priority of each of a plurality of print applications associated with the instruction based on attributes thereof;

executing the first plurality of print applications in an order determined by their relative priorities to retrieve respective associated outputs;

providing the outputs associated with the first plurality of print application to the peripheral device;

receiving a second instruction from a peripheral device to invoke a composite application;

executing a second plurality of print applications associated with the composite application to retrieve respective associated content;

combining the content associated with the second plurality of print applications into a single print document; and providing the print document to the peripheral device.

12. The method of claim 11, wherein the peripheral device comprises a printer.

* * * * *